US010835769B2

(12) United States Patent
Neal et al.

(10) Patent No.: US 10,835,769 B2
(45) Date of Patent: Nov. 17, 2020

(54) FIRE FIGHTING SYSTEM

(71) Applicants: Michael Neal, Decatur, GA (US); Cybil Neal, Decatur, GA (US)

(72) Inventors: Michael Neal, Decatur, GA (US); Cybil Neal, Decatur, GA (US)

(73) Assignees: Michael Neal, Decatur, GA (US); Cybil Neal, Decatur, GA (US)

( * ) Notice: Subject to any disclaimer, the term of this patent is extended or adjusted under 35 U.S.C. 154(b) by 0 days.

(21) Appl. No.: 15/170,331

(22) Filed: Jun. 1, 2016

(65) Prior Publication Data

US 2017/0348556 A1 Dec. 7, 2017

(51) Int. Cl.

| | |
|---|---|
| ***A62C 3/02*** | (2006.01) |
| ***A62C 5/00*** | (2006.01) |
| ***A62C 27/00*** | (2006.01) |
| ***A62C 31/00*** | (2006.01) |
| ***B64C 39/02*** | (2006.01) |
| ***A62C 99/00*** | (2010.01) |

(52) U.S. Cl.

CPC ............ *A62C 3/0292* (2013.01); *A62C 5/002* (2013.01); *A62C 27/00* (2013.01); *A62C 31/005* (2013.01); *A62C 99/0045* (2013.01); *B64C 39/024* (2013.01); *B64C 2201/123* (2013.01)

(58) Field of Classification Search

CPC ....... A62C 3/0292; A62C 5/002; A62C 27/00; A62C 27/862; A62C 55/06; A62C 31/005; B64C 39/024; B64C 2201/123; B62D 55/06

USPC ................ 239/142, 172, 310, 302, 144, 140

See application file for complete search history.

(56) References Cited

U.S. PATENT DOCUMENTS

| | | | | |
|---|---|---|---|---|
| 4,501,828 | A * | 2/1985 | Hadermann | C08J 3/05 106/172.1 |
| 7,264,062 | B1 * | 9/2007 | Ham | A62C 27/00 169/24 |
| 7,451,028 | B2 * | 11/2008 | Pillar | A62C 27/00 169/24 |
| 2004/0199302 | A1 | 10/2004 | Pillar et al. | |
| 2005/0056435 | A1 | 3/2005 | Price et al. | |
| 2010/0106356 | A1 * | 4/2010 | Trepagnier | G01S 17/023 701/25 |
| 2010/0314139 | A1 * | 12/2010 | Jacobsen | A62C 5/004 169/46 |
| 2012/0285706 | A1 | 11/2012 | McLoughin et al. | |
| 2013/0199806 | A1 * | 8/2013 | Zimmerman | A62C 5/022 169/53 |

(Continued)

FOREIGN PATENT DOCUMENTS

| | | | | |
|---|---|---|---|---|
| EP | 0426620 | * | 5/1991 | A62C 25/00 |

*Primary Examiner* — Qingzhang Zhou

(57) ABSTRACT

A mobile firefighting system includes a water cannon enabled for spraying slush on or near a fire. The slush includes solid material (e.g., ice, solid fire retardant) that is projected farther than a liquid could be projected using high pressure. The slush has enhanced fire suppression and fire protection characteristics compared to a liquid. Multiple tanks add enhanced slush chilling capability (e.g., through sequenced chilling) and provide redundant backup systems. A mobile cannon includes multiple reducing nozzles that can be aimed by a rotating base and hydraulic cylinder (for raising and lowering). Continuous tracks and winches contribute to all-terrain capabilities.

7 Claims, 7 Drawing Sheets

(56) References Cited

U.S. PATENT DOCUMENTS

2014/0032021 A1 * 1/2014 Metzler ................. G01S 5/0036
701/3

* cited by examiner

FIRE FIGHTING SYSTEM

CROSS-REFERENCE TO RELATED APPLICATIONS

The present application is a continuation-in-part of pending application Ser. No. 13/907,097.

FIELD OF THE INVENTION

The present disclosure relates to firefighting systems.

BACKGROUND OF THE INVENTION

Firefighters spray water and fire retardant on fires. The spray is typically in liquid form and sprayed at ambient temperature. A spray nozzle facilitates dispersion of the liquid into a stream. The stream is ideally aimed at the fire from a safe distance. Spray nozzles fed with relatively high energy input may cause unwanted atomization of the fluid, where the fluid breaks up into tiny drops. This phenomenon can reduce the effectiveness (e.g., reach, volume) of spraying liquid at ambient temperature to stop fires.

BRIEF SUMMARY OF THE INVENTION

A firefighting system includes at least one inlet for receiving firefighting fluid, a slush cannon, three tanks, a continuous track propulsion system, and a pump for pumping slush through the slush cannon. The slush cannon includes a plurality of reducing nozzles and is movable by a hydraulic cylinder and rotating base. The tanks include chilling units, mixers, and pumps for pumping chilled firefighting fluid. When operated in sequence, a first tank pumps into a second tank, the second tanks in turn pumps into a third tank, and the third tank finally pumps to a holding tank or slush cannon.

Some embodiments are operated remotely or include an operator cabin. Stabilizers can be deployed for increased stability during stationery operation. The system may include one or more winches for retrieving the firefighting system in extreme terrain. The firefighting system sprays a slush of liquid fluid and solid material (e.g., frozen water, solid fire retardant) to a greater distance than available to liquid-based systems.

A further embodiment is a firefighting system including a cannon barrel, at least one nozzle in the cannon barrel, and at least one internal tank. The tank includes at least one intake for introducing water and additive (e.g., fire retardant) to the tank. The tank further includes a mixer for mixing the water and additive into a slush mixture. A chilling element chills the mixture to a semi-frozen slush, where the semi-frozen slush includes solid pieces in a liquid portion. An outlet on the tank is for outputting the semi-frozen mixture for pumping by a high-pressure slush pump. The high-pressure pump projects the semi-frozen slush from the cannon barrel (i.e., through the nozzles). In some embodiments, the firefighting system includes a continuous track propulsion system. A hydraulic cylinder is operated to raise and lower the elevation of the slush cannon. A multistage tank system is included in some embodiments for reiteratively chilling and mixing a firefighting fluid into a semi-frozen slush. Further nozzles may spray firefighting retardant on the firefighting system itself to cool the system during operation. This allows the firefighting system to operate closer to extreme heat.

DETAILED DESCRIPTION OF THE INVENTION

The present disclosure relates to a firefighting system including one that takes the form of a mobile water cannon. Embodied systems process, pump, and project a slush that includes frozen fire retardant (e.g., water, chemicals, a combination of the two, etc.). The partially frozen slush (e.g., with solids) is pumped farther than a typical liquid-based fluid with no solid material. This enables maintaining a greater distance between the firefighting apparatus (e.g., the mobile water cannon) and a fire.

A mobile firefighting system includes a water cannon enabled for spraying slush on or near a fire. The slush includes solid material (e.g., ice, solid fire retardant) that is projected farther than a liquid could be projected using high pressure. The slush has enhanced fire suppression and fire protection characteristics compared to a liquid. Multiple tanks add enhanced slush chilling capability (e.g., through sequenced chilling) and provide redundant backup systems. A mobile cannon includes multiple reducing nozzles that can be aimed by a rotating base and hydraulic cylinder (for raising and lowering). Continuous tracks and winches contribute to all-terrain capabilities.

An embodied system comprises a water cannon fed by a slush pump (e.g., centrifugal pump). The cannon is mounted on a rotating base. The rotating base is affixed to a vehicle platform or frame. The vehicle includes heavy tracks of the type found in construction equipment or military tanks (i.e., continuous tracks, tank tread, or caterpillar tracks). The angle of the cannon is adjusted using one or more hydraulic cylinders. In some embodiments, the mobile water cannon includes a protective cabin for a driver. The cannon may have multiple nozzles and in some embodiments, the cannon includes eight nozzles for projecting slush.

Figure 1:
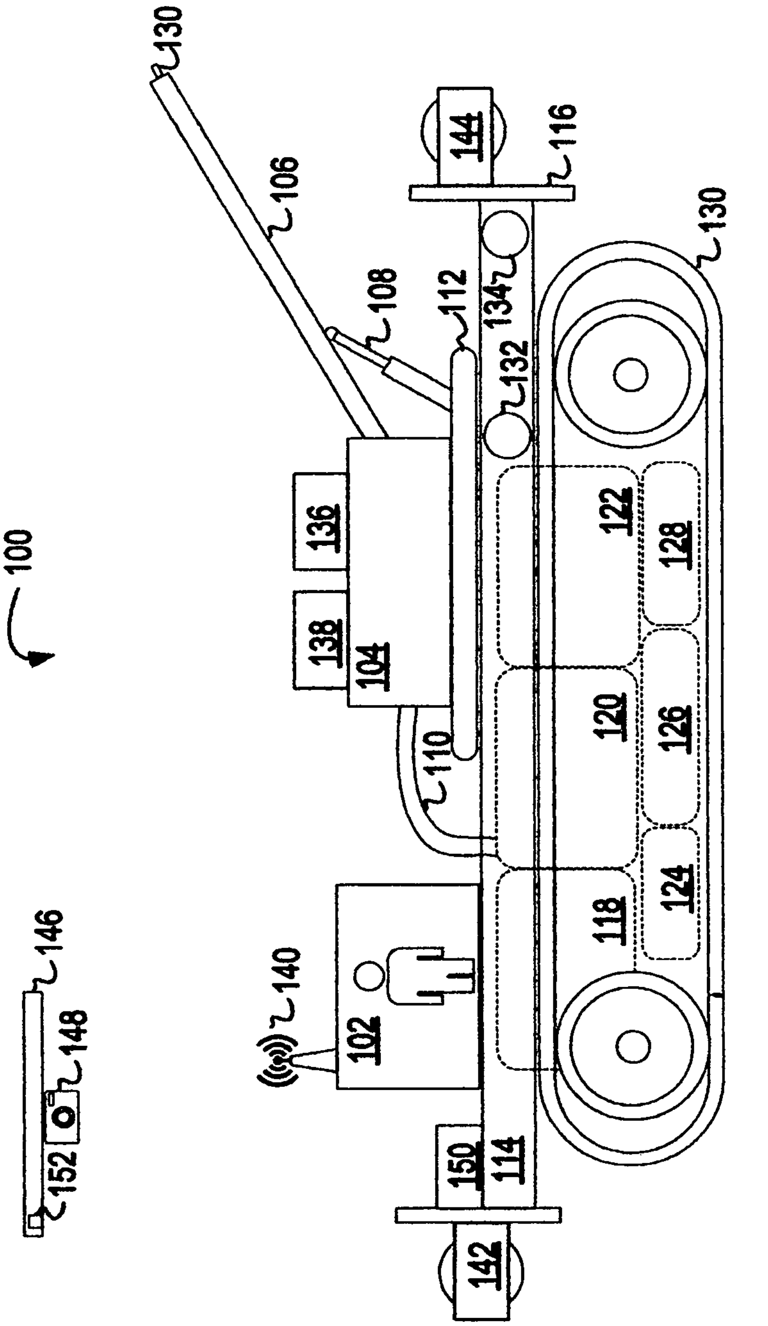
FIG. 1 depicts selected elements of a disclosed fire fighting system.

In accordance with disclosed embodiments, FIG. 1 depicts fire fighting system 100. The system includes cannon 106 which sprays a slush through nozzle 130. Nozzle 130 releases a slush of liquid water, frozen water, and potentially firefighting additives in the direction of a fire. Cannon 106 is mounted to rotating base 112 through housing 104. Platform 114 provides a foundation for rotating base 112. A local operator, remote operator, or autonomous control system spins rotating base 112 to aim cannon 106 toward the fire or potential fire. Hydraulic lift 108 elevates cannon 106 to the proper height to achieve the desired spray characteristics. The slush is projected farther and more accurately than liquid water due in part to the nature of solids traveling through air. Solids are not prone to break up like liquid when encountering air at relatively high speed, and can therefore be projected farther.

Other features of firefighting system 100 include flexible hose 110, which allows rotating base 112 to rotate while still providing fire retardant liquid through nozzle 130. Optional cooling nozzle 138 permits the firefighting system to self-cool, by spraying itself with chilled fire retardant liquid. Stabilizer 116 is lowered to increase stability of the unit during stationery operation. Tracks 130 provide all-terrain capability to access remote areas, for example during a forest fire. Winch 142 and winch 144 further enhance off-road capabilities in the event the unit becomes stuck. Camera 136 provides video and photographic data to an operator in cabin 102 or a remote operator.

Water is provided to the firefighting system through inlet 132. Example water sources are fire hydrants, water tanks, a lake, or a fire truck. Firefighting chemicals or additives are introduced through inlet 134. The water and additives are provided to tanks 118, 120, and 122 for mixing and cooling. In some embodiments, each tank includes a chilling unit to lower the temperature of the mixture into a slush with frozen solids. After the chilled mixture leaves the tanks, optional slush tank 124 is filled. Slush pump 126 pumps the slush at a high pressure for spring from nozzle 130.

As shown, firefighting system 100 includes cabin 102 that provides protection to one or more operators. For particularly dangerous fires, firefighting system 100 is operated autonomously or remotely. To that end, control module 128 communicates wirelessly through communication module 140 with remote operators and optional drone unit 146. Control module 128 can be programmed to operate with a varied degree of autonomy. When operated automatically, the system receives input from sensor modules 150 and 152. Sensor module 150 relays to a controller (e.g. control module 128) information such as temperature, elevation, location (e.g., GPS coordinates), and angle (i.e., regarding orientation of the vehicle). Accordingly, sensor 150 includes, or is communicatively coupled to, transducers for sensing such information.

As shown, drone unit 146 includes camera 148 and sensor 152. Sensor module 152 includes or is communicatively coupled to transducers for sensing temperature, elevation, location (e.g., GPS coordinates). Sensor module 152 further provides communication capabilities (e.g., to remote operators or the local operator of the system). Communication module 140 receives information from sensor module 152 and relays the information to a remote operator or a local operator in cabin 102. Sensor 152 measures the temperature at variable elevations around a fire to determine hotspots, for example.

Figure 2:
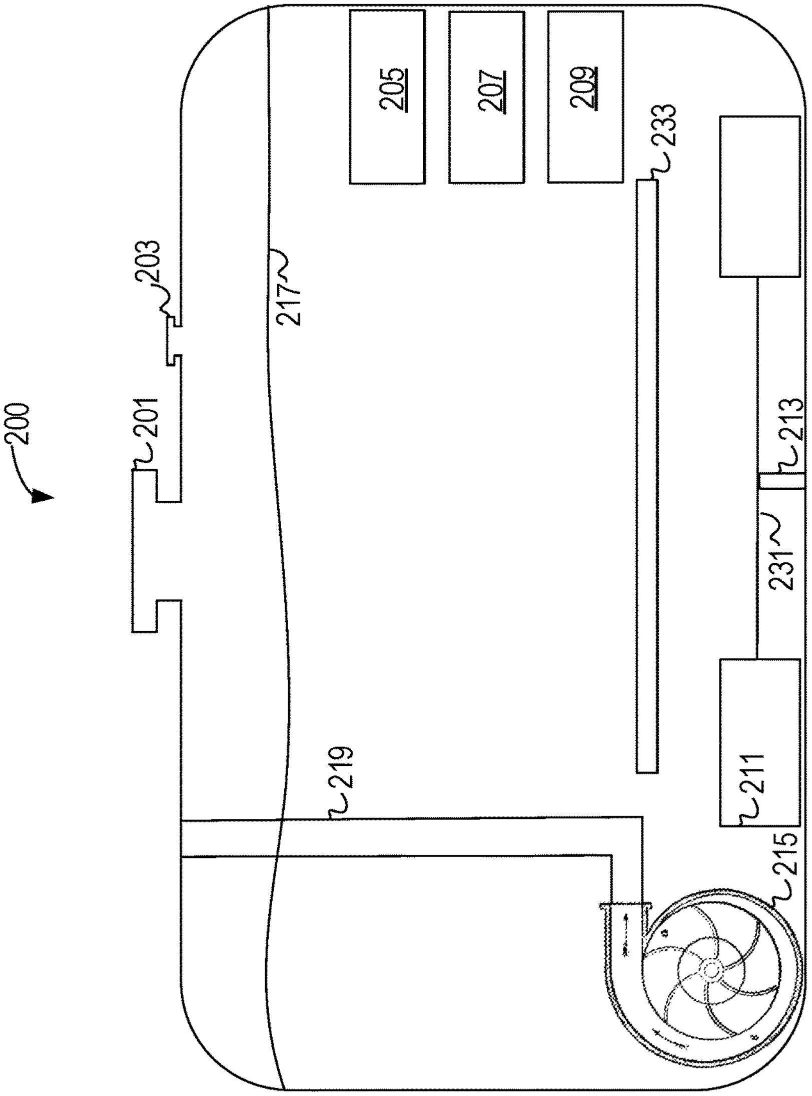
FIG. 2 depicts an internal tank from the fire fighting system from FIG. 1.

FIG. 2 includes additional details of the system from FIG. 1. FIG. 2 depicts tank 200, which is similar to or identical to tanks 118, 120, and 122 (FIG. 1). An embodied system (e.g., firefighting system 100 of FIG. 1) adds water to tank 200 through inlet 201 and adds additives (e.g., ice, chemicals, retardant) through inlet 203. Pump 215 has discharge 219 for sending a mixture of chilled water and additive to the water cannon (e.g., through nozzle 130) or a second tank (e.g., tank 120). Chilling element 233 lowers the mixture's temperature. Concentration detector 205 determines concentration of the additive within the mixture. In some embodiments, the concentration detector senses the solid concentration (e.g., percentage of ice or solid fire retardant) within the mixture. Level detector 209 and temperature detector 207 provide input to a control module (e.g., control module 128 in FIG. 1) for controlling chilling element 233 and pump 215. Mixer 231 includes blade 211 which rotates about axis 213. Tank 200 produces mixture 217 that may only become a slush after further treatment (e.g., cooling and mixing) in second and third stage tanks (e.g., tanks 120 and 122 in FIG. 1).

Figure 3:
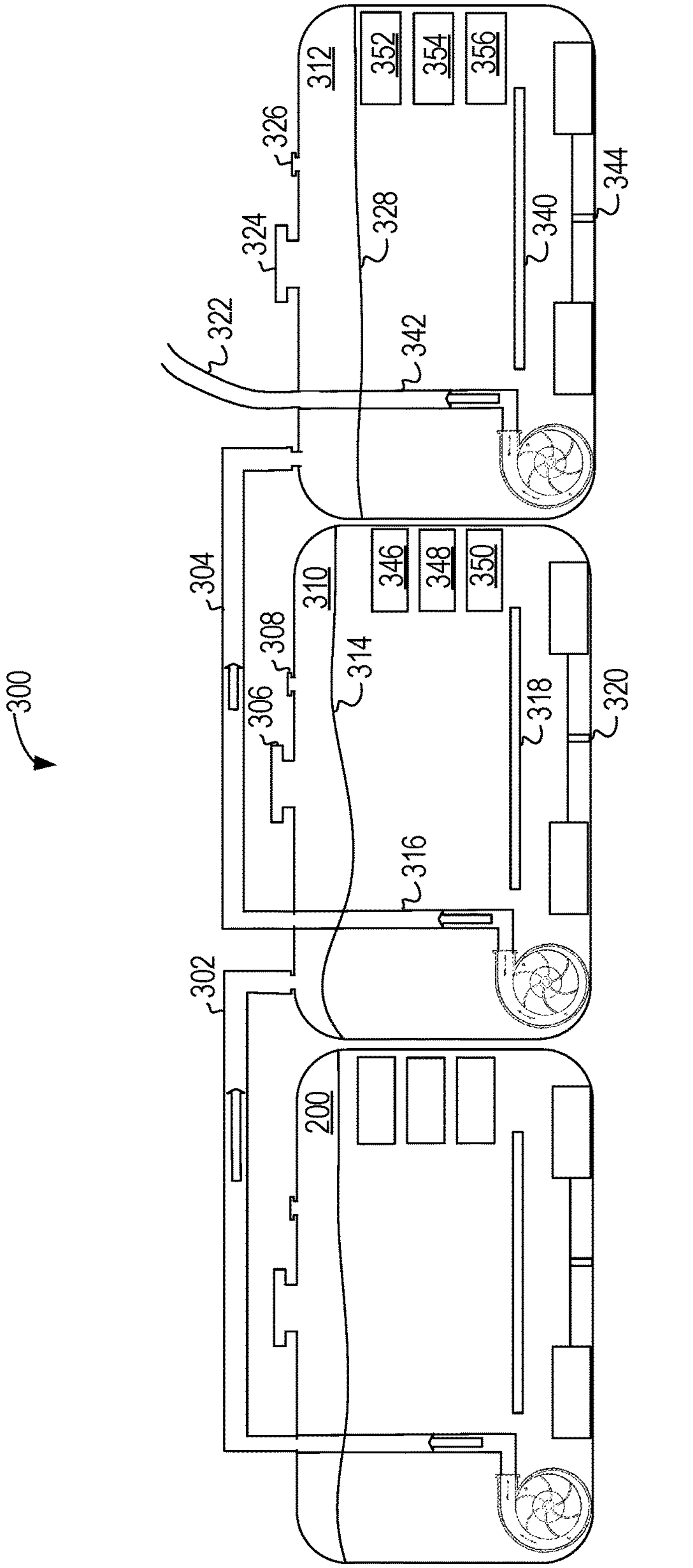
FIG. 3 shows a battery (e.g., three) of internal tanks from the fire fighting system from FIG. 1.

FIG. 3 illustrates three tanks in sequence to form tank battery 300. Here the tanks shown operate in sequence; however, in some embodiments the tanks are operated in parallel to feed a water cannon. Tank 200 (FIG. 3) is the same or similar to the tank illustrated in FIG. 2. Transfer line 302 includes a slush (a.k.a. first chilled liquid) which is provided to tank 310. Transfer line 302 may have its own inlet as shown or alternatively may use inlet 306. Inlet 308 is for adding additive to the mixture in tank 310. Similar to tank 200 (FIG. 2 and FIG. 3), tank 310 includes concentration detector 346, temperature detector 348, and level detector 350. Chilling element 318 similarly reduces the temperature of mixture 314. Mixer 320 rotates and has mixing blades for stirring the mixture.

Similar to the other two tanks in FIG. 3, tank 312 includes concentration detector 352, temperature detector 354, and level detector 356. Mixer 344 stirs the mixture and chilling element 340 reduces its temperature. Mixture 328 in tank 312 is intended to be a slush that includes solids (e.g. solid water, ice, and/or solid additives) and other liquid (water and/or liquid additives). Level detector 356, concentration detector 352, and temperature detector 354 provide input to a control module (e.g., control module 128 in FIG. 1) for controlling chilling element 340 and determining when to pump the slush from pump discharge 342 to outlet 322. As shown, outlet 322 includes a flexible line for feeding a water cannon installed on a rotating base. Tank 310 has pump discharge 316 which sends a slush (e.g., mixture 328) through transfer line 304 to tank 312.

Figure 4:
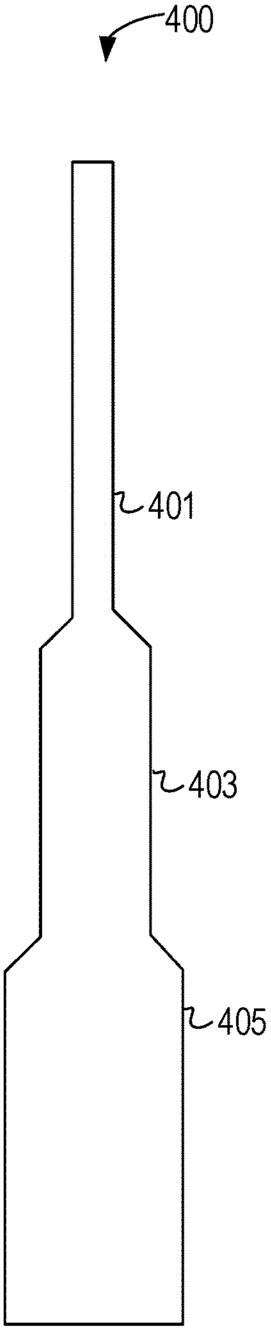
FIG. 4 depicts a reducing nozzle from an embodied fire fighting system.

FIG. 4 includes nozzle 400 which depicts a nozzle from an embodied water cannon. In some embodiments, a water cannon includes multiple (e.g., eight) elements similar to or identical to nozzle 400. Nozzle 400 includes discharge end 401 and intake end 405. A slush including liquids and solids is introduced into intake end 405, and the slush is forced through reducing region 403 to discharge end 401.

As shown, discharge end 401 has further decreased diameter compared to reducing region 403 and intake end 405. This configuration is one form of reducing nozzle. A continuous reduction (e.g. cone shaped) arrangement may be employed. This causes greater velocity in the slush which contributes to sending the slush greater distances. In some embodiments, a cannon barrel with multiple elements is similarly choked down to match the profile of the multiple nozzles inside.

Figure 5:
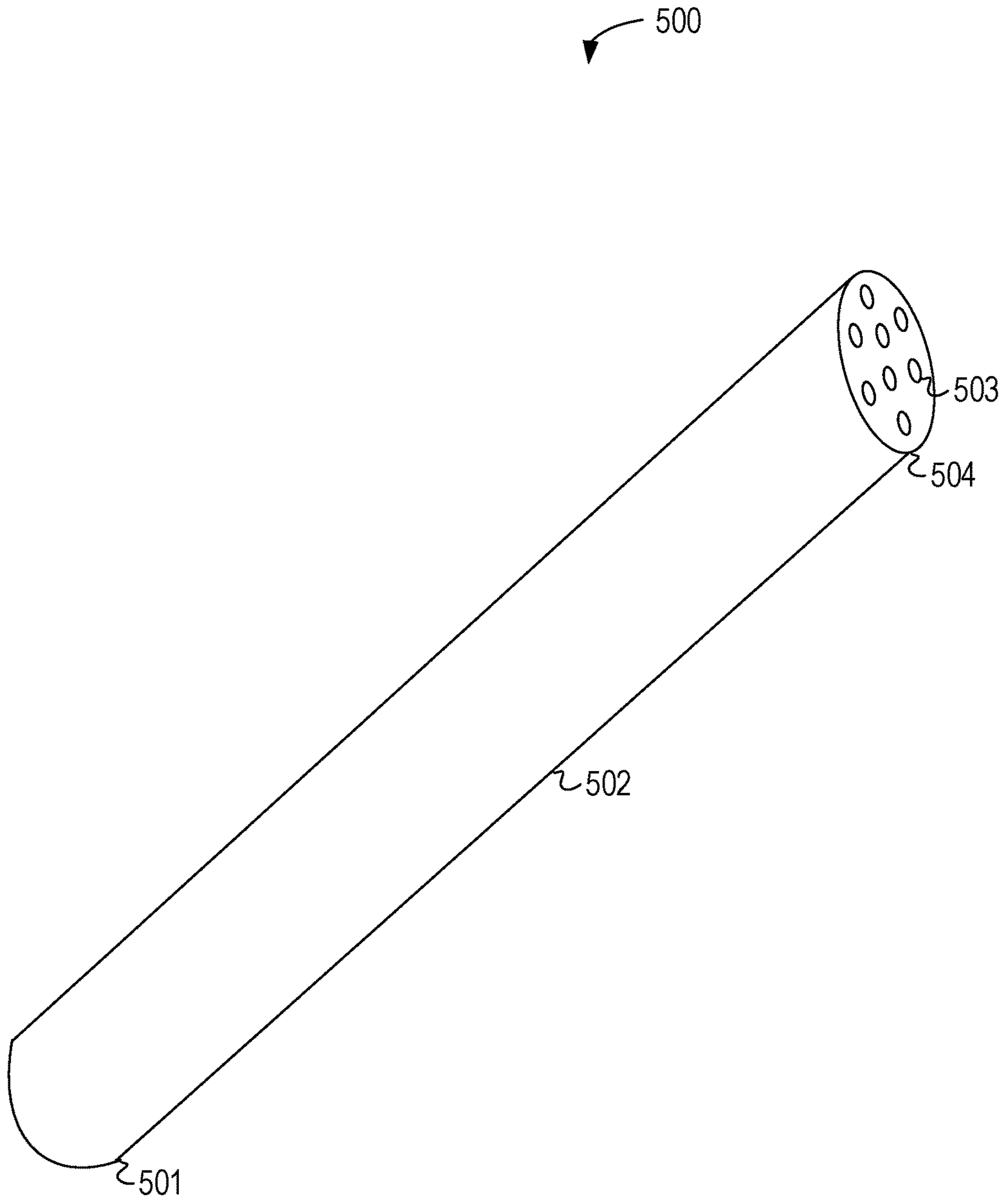
FIG. 5 depicts a multi-nozzle cannon from an embodied fire fighting system.

FIG. 5 depicts cannon barrel 500. As shown, cannon barrel 500 is a compound barrel (or Gatling type barrel) with multiple (e.g., eight) nozzles including nozzle 503. Nozzle 503 may be similar to or identical to nozzle 400 (FIG. 4). Cannon barrel 500 includes cannon body 502, intake end 501, and discharge end 504. In some embodiments, cannon body 502 has a stepped diameter that decreases between intake end 501 and discharge end 504.

Figure 6:
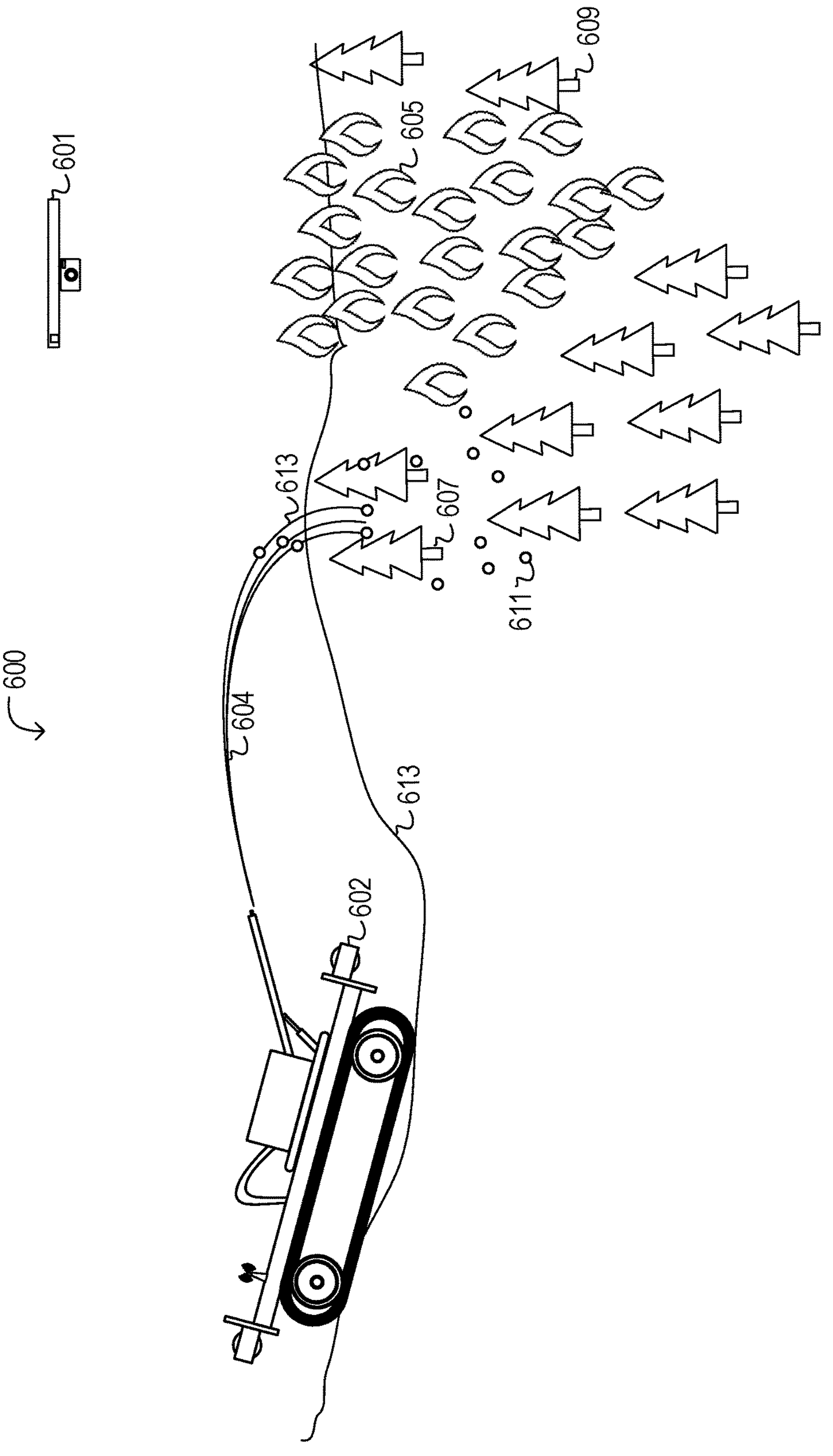
FIG. 6 shows a disclosed system in action, spraying slush onto trees near a forest fire.

FIG. 6 depicts an environment (e.g., forest fire) in which an embodied system can be deployed. FIG. 6 depicts fire fighting system 600, which includes water cannon 602 and drone 601. Optional drone 601 provides intelligence (e.g., temperature, location, video) regarding a fire and any threatened areas. Drone 601 further can be used to map a route for the water cannon, and to anticipate potential obstacles. As shown, water cannon 602 sprays a slush 604 containing solid pieces (e.g., solid piece 611) (e.g., ice and/or solid fire retardant) and liquid 613 (e.g., water and fire retardant). The slush is sprayed toward trees 607 to prevent fire 605 from spreading. As shown, trees 609 are threatened by fire 605 as well. An operator can adjust the trajectory (using the hydraulic cylinders), spray pressure, and potentially the mixture of the slush to reach the desired protection zone (e.g., trees 609). In this way, embodied systems provide all terrain capability and enhanced delivery of fire retardant through the use of an on-demand fire fighting slush. In an urban environment, the slush can be used to knock out windows, roofs, or doors if desired to project fire retardant into engulfed or threatened areas of a building. The projection of solids within the slurry enhances the delivery to occur at greater velocity, distance, and penetration.

Some components of the firefighting system are performed by specially programmed data processing systems that themselves contain applications, firmware, and software for performing such tasks as controlling the slush temperature, pumping between tanks, autonomously navigating, interacting with an optional drone, exchanging data with a remote control operator, receiving water and additives from external sources, mixing additive with water, controlling tank mixers, controlling tank levels, controlling tank pressures, controlling discharge pressure of the water cannon, and so on. The electronics and programming involved in such sub-components is well within the skill of a person having ordinary skill in the art. Standard transducers, actuators, and data processing systems (e.g., microprocessors, microcontrollers, computers) can be used, as is well known in the art.

Figure 7:
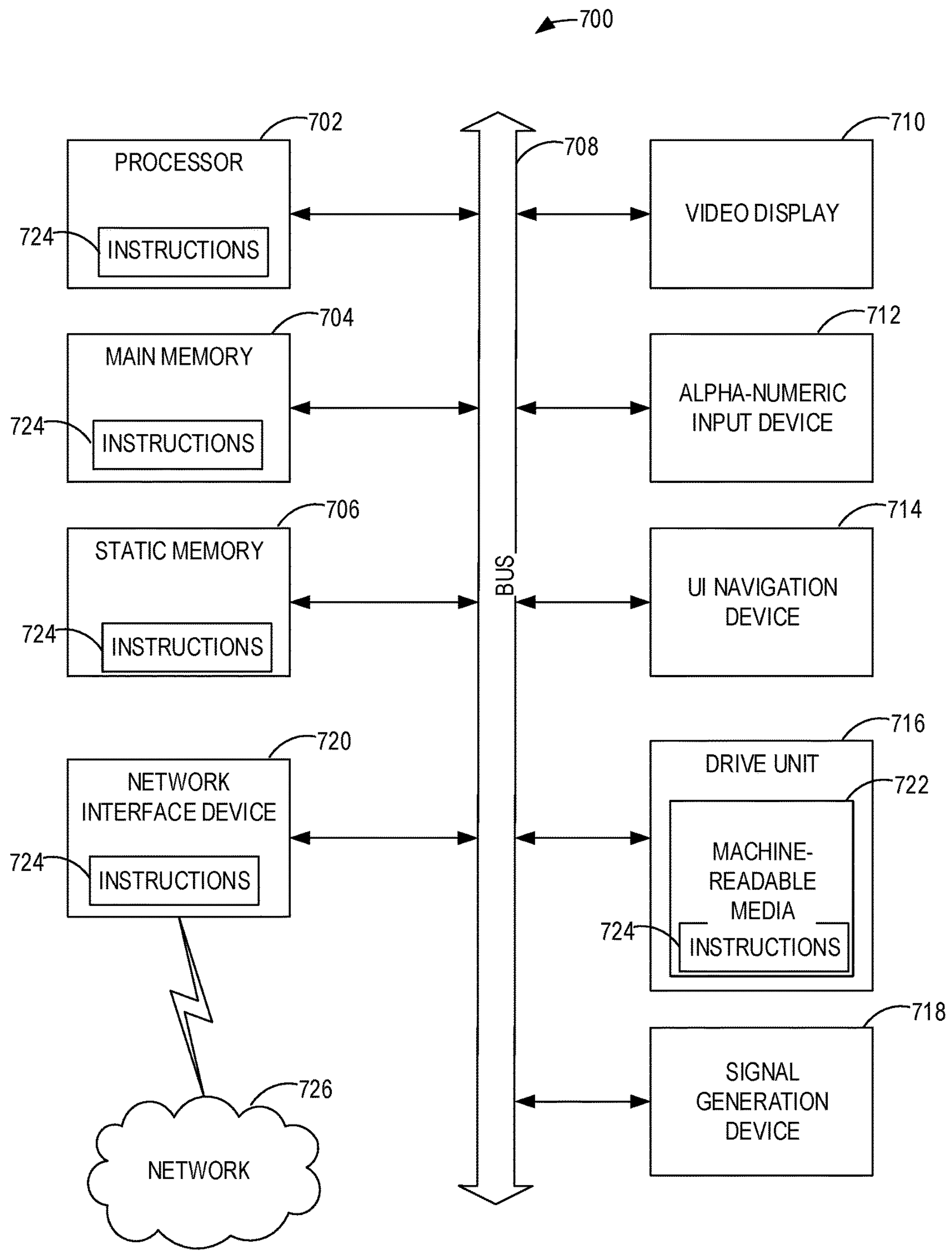
FIG. 7 is a block diagram of a data processing system (e.g., processor) that interacts and performs in disclosed systems to enable disclosed features (e.g., control, autonomy, sensing, decision making) of disclosed fire fighting systems.

Components of an example data processing system are shown in FIG. 7. As shown, data processing system 700 includes a processor 702 (e.g., a central processing unit, a graphics processing unit, or both) and storage 701 that includes a main memory 704 and a non-volatile memory 726. Drive media 722 and other components of storage 701 communicate with processor 702 via bus 708. Drive media 722 includes a magnetic or solid state machine-readable medium 722 that may have stored thereon one or more sets of instructions 724 and data structures (not depicted) embodying or utilized by any one or more of the methodologies or functions described herein. The instructions 724 may also reside, completely or at least partially, within the main memory 704, within non-volatile memory 726, and/or within the processor 702 during execution thereof by the data processing system 700. Data processing system 700 may further include a video display unit 710 (e.g., a television, a liquid crystal display or a cathode ray tube) on which to display Web content, multimedia content, and input provided during collaboration sessions. Data processing system 700 also includes input device 712 (e.g., a keyboard), navigation device 714 (e.g., a remote control device or a mouse), signal generation device 718 (e.g., a speaker) and network interface device 720. Input device 712 and/or navigation device 714 (e.g., a remote control device) may include processors (not shown), and further memory (not shown).

Instructions 724 may be transmitted or received over network 767 (e.g., local network, automatic meter infrastructure network, cellular network, a multimedia content provider network) via network interface device 720 using any one of a number of transfer protocols (e.g., broadcast transmissions, HTTP, GSM, LTE, etc.).

As used herein the term "machine-readable medium" should be construed as including a single medium or multiple media (e.g., a centralized or distributed database, and/or associated caches and servers) that may store all or part of instructions 724. The term "machine-readable medium" shall also be taken to include any medium that is capable of storing, encoding, or carrying a set of instructions (e.g., instructions 724) for execution by a machine (e.g., data processing system 700) and that cause the machine to perform any one or more of the methodologies or that is capable of storing, encoding, or carrying data structures utilized by or associated with such a set of instructions. The term "machine-readable medium" shall, accordingly, be taken to include but not be limited to solid-state memories, optical media, and magnetic media.

In accordance with some disclosed embodiments, data processing system 700 executes instructions 724. Instruction 724 may include instructions for providing remote control unit 136 (FIG. 1), communication module 140 (FIG. 1), sensor module 150 (FIG. 1), sensor unit 152 (FIG. 1), concentration detector 205 (FIG. 2), temperature detector 207 (FIG. 2), level detector 209 (FIG. 2), concentration detector 346 (FIG. 3) temperature detector 348 (FIG. 3), level detector 350 (FIG. 3), concentration detector 352 (FIG. 3), temperature detector 354 (FIG. 3), and level detector 356 (FIG. 3). Instructions 724 may include instructions for processing transducer input and detecting the presence of high temperatures, level, location, concentration, percent solids, speed, tilt angle, mixture temperature, pressure and so on. Instructions 724 may operate on processor 401, as an example, and form operating system 403 and applications 413. Instructions 724 may include instructions for processing GPS data, camera data, clock data, calendar data, and GPS data. Instructions 724 may include instructions for receiving input through a keyboard or other input device (e.g., a touchscreen, mouse, joystick, etc.). Instructions 724 may include instructions for interacting with or implementing WAN/LAN communications modules that facilitate cellular, Wi-Fi, Bluetooth, and NFC and other forms of communications between drones, other units, remote control units, and the like.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed:

1. A firefighting system comprising:

at lease one inlet for receiving firefighting fluid;

a slush cannon comprising a plurality of reducing nozzles, each of the plurality of reducing nozzles includes a discharge end and an intake end, wherein the discharge end has further decreased diameter compared to a reducing region and the intake end;

wherein the slush cannon is moveable by at least: a hydraulic cylinder; and a rotation base;

a first tank comprising: a first chiller;

a first mixer; and a first pump for pumping first chilled firefighting fluid into a second tank;

wherein the second tank comprises: a second chiller for chilling the first chilled firefighting fluid;

a second mixer for further mixing the first chilled firefighting fluid to result in second chilled firefighting fluid; and a second pump for pumping the second chilled firefighting fluid to a third tank; wherein the third tank comprises:
a third chiller for chilling the second chilled firefighting fluid;
a third mixer for further mixing the second chilled firefighting fluid to result in the third chilled firefighting fluid;
a third concentration detector;
a third temperature detector;
a third level detector; and
a third pump for pumping the third chilled firefighting fluid from the third tank, wherein the third chilled firefighting fluid is a slush;
wherein the third concentration detector, the third temperature detector, and the third level detector are configured to provide input to a control module for controlling the third chiller and determining when to pump the slush from the third pump to an outlet, wherein the outlet comprising a line for feeding the slush cannon and
a fourth pump for pumping the slush through the slush cannon;
and a continuous track propulsion system.

2. The firefighting system of claim 1, further comprising: an operator cabin.

3. The firefighting system of claim 1, further comprising: a stabilizer for deployment during stationary operation.

4. The firefighting system of claim 1, further comprising: at least one winch.

5. The firefighting system of claim 1, wherein the third chilled firefighting fluid comprises: liquid water and frozen water.

6. The firefighting system of claim 5, wherein the third chilled firefighting fluid further comprises: fire retardant chemical.

7. The firefighting system of claim 1, wherein the third chilled firefighting fluid comprises: liquid water and solid fire retardant chemical.

* * * * *